(12) United States Patent
Tamayama et al.

(10) Patent No.: US 6,545,708 B1
(45) Date of Patent: Apr. 8, 2003

(54) CAMERA CONTROLLING DEVICE AND METHOD FOR PREDICTED VIEWING

(75) Inventors: Ken Tamayama, Tokyo (JP); Tadafusa Tomitaka, Chiba (JP); Masakazu Koyanagi, Chiba (JP); Toshiyuki Iijima, Kanagawa (JP); Naoyasu Hosonuma, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/111,337

(22) Filed: Jul. 7, 1998

(30) Foreign Application Priority Data

Jul. 11, 1997 (JP) .............................................. 9-186517

(51) Int. Cl.[7] .............................................. H04N 5/232
(52) U.S. Cl. .................. 348/211.8; 348/333.11
(58) Field of Search .................. 348/207, 211, 348/212, 213, 218, 333.01, 333.02, 333.05, 333.11, 333.12, 14.01, 14.02, 14.03, 14.07, 14.08, 14.12, 14.16, 211.99, 211.1, 211.3, 211.4, 211.6, 211.8, 211.13, 222.1; H04N 5/232

(56) References Cited

U.S. PATENT DOCUMENTS 6,320,614 B1 * 11/2001 Kawashima ................. 348/143
6,356,303 B1 * 3/2002 Shibata et al. ............... 348/211
6,380,972 B1 * 4/2002 Suga et al. .................. 348/211

* cited by examiner

Primary Examiner—Tuan Ho
(74) Attorney, Agent, or Firm—Frommer Lawrence & Haug LLP; William S. Frommer; Darren M. Simon

(57) ABSTRACT

A personal computer detects the current state of a video camera with reference to setting information transmitted thereto from a work station. When a command for controlling the video camera is inputted from a mouse, the personal computer predicts an image, which is assumed to be shot by the video camera upon execution of the command, with reference to both the information transmitted from the work station and the command inputted from the mouse, and then displays the predicted image on a CRT monitor. Referring to the image being displayed on the CRT monitor, a user performs a manipulation to instruct execution of the command in the case of executing the previous input command. As a result, the command inputted previously is transmitted to the work station via an internet, thereby controlling the video camera and a pan tilter. Thus, the video camera connected via a network or the like can be controlled smoothly.

11 Claims, 14 Drawing Sheets

FIG. 4

```
START
  │
  ▼
INITIALIZE ─ S1
  │
  ▼
REQUEST AND DISPLAY PANORAMA IMAGE ─ S2
  │
  ▼
STAND BY FOR EVENT ─ S3 ◄──────────────┐
  │                                     │
  ▼                                     │
BUTTON DEPRESSED? ─ S4 ──NO─────────────┤
  │ YES                                 │
  ▼                                     │
ACQUIRE MOUSE POSITION ─ S5             │
  │                                     │
  ▼                                     │
ON FRAME? ─ S6 ──YES──► START DRAG WITH CHANGED VIEW ANGLE ─ S10
  │ NO                                       │
  ▼                                          │
WITHIN FRAME? ─ S7 ──YES──► START DRAG WITH FIXED VIEW ANGLE ─ S11
  │ NO                                       │
  ▼                                          ▼
FORM FRAME AROUND MOUSE POSITION WITH VIEW ANGLE UNCHANGED, AND START DRAG WITH FIXED VIEW ANGLE ─ S8
  │
  ▼
FORM AND DISPLAY PREVIEW IMAGE ─ S9
  │
  ▼
BUTTON RELEASED? ─ S12 ──YES──► TERMINATE DRAG ─ S13
  │ NO                                │
  │                                   ▼
  │                         CALCULATE VIEW ANGLE AND DIRECTION OF PAN TILTER FROM POSITION AND SIZE OF FRAME ─ S14
  │                                   │
  │                                   ▼
  │                         SEND COMMANDS FOR DRIVING PAN TILTER AND ZOOM ─ S15
  │                                   │
  │                                   ▼
  │                         ERASE FRAME AND PREVIEW ─ S16
  ▼
MOUSE MOVED? ─ S17 ──NO──► (to S23)
  │ YES
  ▼
IN DRAG? ─ S18 ──NO──► (to S23)
  │ YES
  ▼
VIEW ANGLE CHANGED? ─ S19 ──YES──► CHANGE FRAME SIZE ─ S22
  │ NO                                  │
  ▼                                     │
SHIFT FRAME ─ S20                       │
  │                                     │
  ▼◄────────────────────────────────────┘
FORM AND DISPLAY PREVIEW IMAGE ─ S21

IMAGE RECEIVED? ─ S23 ──YES──► DISPLAY IMAGE ─ S24
  │ NO                              │
  ▼                                 ▼
ERROR ─ S26                    SEND REQUEST FOR NEXT IMAGE ─ S25
```

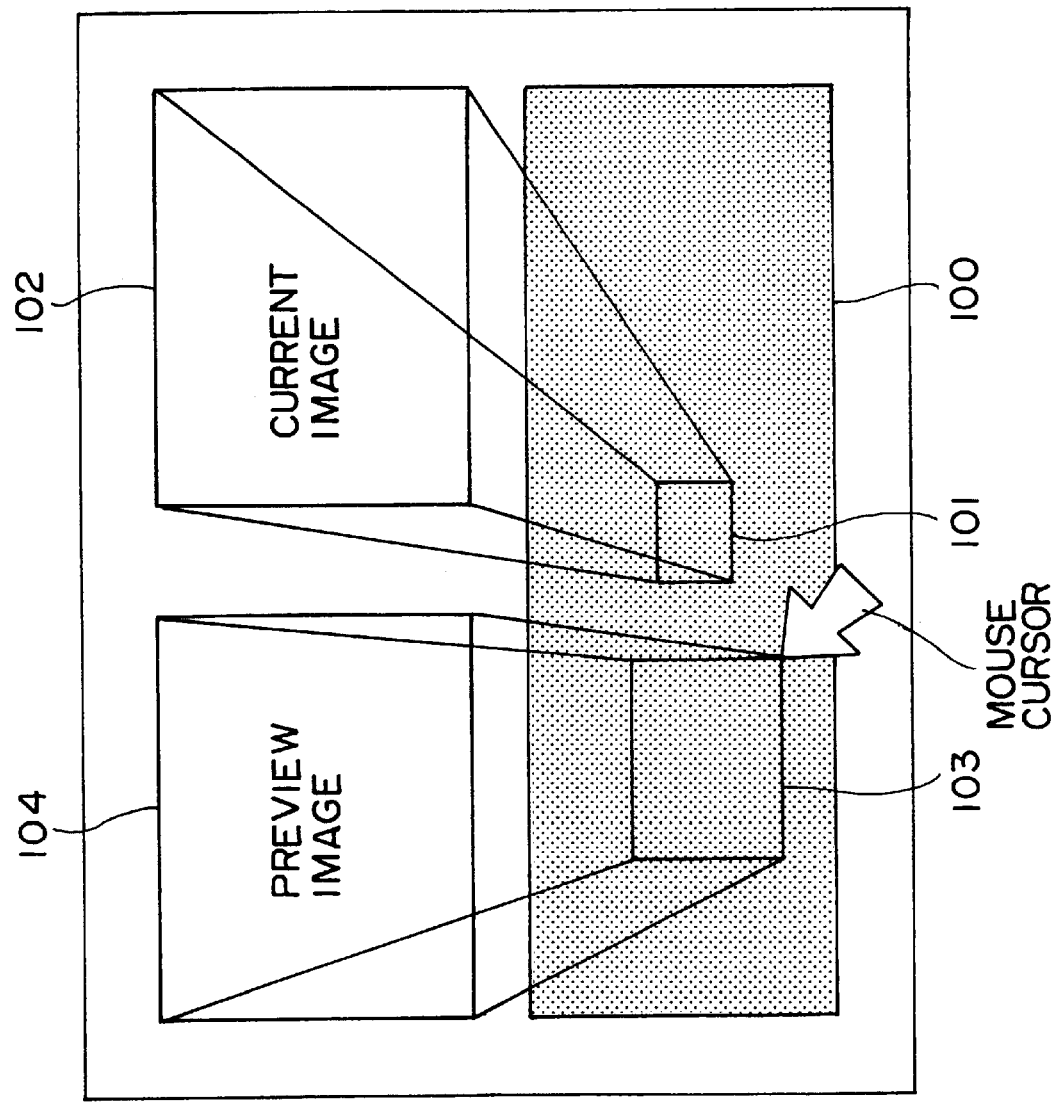

CAMERA CONTROLLING DEVICE AND METHOD FOR PREDICTED VIEWING

BACKGROUND OF THE INVENTION

The present invention relates to a controlling device, a controlling method, a receiving apparatus, a receiving method, an image reproducing apparatus, an image reproducing method and a transmission medium, and more particularly to those adapted for control of an image pickup device.

In monitoring through remote control of an image pickup device such as a video camera, it has been customary heretofore that a controlling device on the side of an operator is connected to the image pickup device via a communication line, and the operator manipulates the controlling device in a manner to obtain a desired image while watching the images transmitted thereto.

When the image pickup device has a recorder, any still or moving image outputted from the image pickup device is once recorded in a recording medium such as a film or magnetic tape and then is transmitted to the operator via a communication line.

In the related art, it is generally ordinary to employ an analog line or ISDN as a communication line. However, since an image transmission rate is not sufficiently high in any of such communication lines, there exists a problem that an extremely long time is required for confirming whether a desired image has been obtained or not.

Moreover, there may occur a case where the delay or the transmission rate in the communication line is not exactly fixed, so that a feedback loop including the operator is rendered unstable to consequently bring about some difficulty in control.

Further, due to the reason mentioned, trial and error are repeated until finding a proper manipulation to realize the intended result, hence raising another problem that some vain communication and operation of the image pickup device are caused.

Besides the above, when retrieving a desired scene out of entire still or moving images recorded in the recorder, random access is difficult since the recording medium is a film or magnetic tape as described, whereby a long time is required until arrival at the desired scene.

SUMMARY OF THE INVENTION

It is therefore an object of the present invention to realize smooth control of an image pickup device executed via a communication line.

According to a first aspect of the present invention, there is provided a controlling device which comprises an input means to input information for setting an image pickup device; a prediction means for predicting an image of an object to be obtained upon reset of the image pickup device in response to the setting information received from the input means; an output means for outputting to a display device the image obtained from the prediction means; a decision means for making a decision as to whether a control action corresponding to the setting information from the input means is to be executed or not; and a send means for sending a control signal, which corresponds to the setting information received from the input means, to the image pickup device via a transmission medium after execution of the control action is decided by the decision means.

According to a second aspect of the present invention, there is provided a controlling method which comprises the steps of detecting a current set state of an image pickup device; inputting information for setting the image pickup device; predicting an image of an object to be obtained upon reset of the image pickup device in response to the input setting information; outputting the predicted image to a display device; making a decision as to whether a control action corresponding to the input setting information is to be executed or not with reference to the image being displayed on the display device; and sending a control signal, which corresponds to the input setting information, to the image pickup device via a transmission medium after execution of the control action is decided in the preceding step.

According to a third aspect of the present invention, there is provided a transmission medium for transmitting a computer program which has functions to execute the steps of inputting information for setting an image pickup device; predicting an image of an object to be obtained upon reset of the image pickup device in response to the input setting information; outputting the predicted image to a display device; making a decision as to whether a control action corresponding to the input setting information is to be executed or not with reference to the image being displayed on the display device; and sending a control signal, which corresponds to the input setting information, to the image pickup device via a transmission medium after execution of the control action is decided in the preceding step.

According to a fourth aspect of the present invention, there is provided a receiving apparatus which comprises a receiving means for receiving pickup-device setting information transmitted thereto from a controlling device via a transmission medium; a prediction means for predicting an image of an object to be obtained upon reset of the image pickup device in response to the setting information received from the input means; a send means for sending to the controlling device the image obtained from the prediction means; and a setting means for setting the image pickup device in response to the setting information upon reception of a control command from the controlling device to set the image pickup device in response to the setting information.

According to a fifth aspect of the present invention, there is provided a receiving method which comprises the steps of receiving pickup-device setting information transmitted from a controlling device via a transmission medium; predicting an image of an object to be obtained upon reset of the image pickup device in response to the received setting information; sending the predicted image to the controlling device; and setting the image pickup device in response to the setting information upon reception of a control command from the controlling device to set the image pickup device in response to the setting information.

According to a sixth aspect of the present invention, there is provided a transmission medium for transmitting a computer program which has functions to execute the steps of receiving pickup-device setting information transmitted from a controlling device via a transmission medium; predicting an image of an object to be obtained upon reset of the image pickup device in response to the received setting information; sending the predicted image to the controlling device; and setting the image pickup device in response to the setting information upon reception of a control command from the controlling device to set the image pickup device in response to the setting information.

According to a seventh aspect of the present invention, there is provided an image reproducing apparatus which comprises a first storage means for storing images picked up by an image pickup device; a second storage means for storing pickup-device setting information at the time of shooting the images; an input means to input a range of images to be reproduced; a retrieval means for retrieving the images, which correspond to the range obtained from the input means, out of the entire images stored in the first storage means; a conversion means for converting the retrieved images in response to the relevant setting information stored in the second storage means; a composition means for forming a single composite image out of the converted images; and an output means for outputting the composite image to a display device.

According to an eighth aspect of the present invention, there is provided an image reproducing method which comprises the steps of storing images shot by an image pickup device; storing pickup-device setting information at the time of shooting the images; inputting a range of images to be reproduced; retrieving the images, which correspond to the range obtained from the input step, out of the entire images stored in the first storage step; converting the retrieved images in response to the relevant setting information stored in the second storage step; forming a single composite image out of the converted images; and outputting the composite image to a display device.

And according to a ninth aspect of the present invention, there is provided a transmission medium for transmitting a computer program which has functions to execute the steps of storing images shot by an image pickup device; storing pickup-device setting information at the time of shooting the images; inputting a range of images to be reproduced; retrieving the images, which correspond to the scope obtained from the input step, out of the entire images stored in the first storage step; converting the retrieved images in response to the relevant setting information stored in the second storage step; forming a single composite image out of the converted images; and outputting the composite image to a display device.

In the above controlling device, controlling method and transmission medium of the first, second and third aspects, information for setting an image pickup device is inputted, and then an image of an object to be obtained upon reset of the image pickup device in response to the input setting information is predicted. Subsequently the image thus predicted is outputted to a display device, and a decision is made as to whether a control action corresponding to the input setting information is to be executed or not with reference to the image being displayed on the display device. And if the result of this decision is affirmative to signify execution of the control action, a control signal relevant to the input setting information is sent to the image pickup device via the transmission medium. For example, when new setting information at the time of shooting the object by the image pickup device is inputted, an image of the object to be obtained upon reset of the image pickup device in response to the input setting information is predicted. Thereafter the predicted image is outputted to the display device, and a decision is made, with reference to the image being displayed on the display device, as to whether a control action corresponding to the input setting information is to be executed or not. And upon decision that the control action is to be executed, the input setting information is sent to the image pickup device via the transmission medium. Therefore, it becomes possible to prevent transmission of any unnecessary control command to the image pickup device, hence realizing smooth control of the image pickup device.

In the above receiving apparatus, receiving method and transmission medium of the fourth, fifth and sixth aspects, pickup-device setting information transmitted from a controlling device via a transmission medium is received, and then an image of an object to be obtained upon reset of the image pickup device in response to the received setting information is predicted. Subsequently the predicted image is sent to the controlling device, and upon reception of a control command from the controlling device to set the image pickup device in response to the setting information, the image pickup device is set in accordance with the setting information. For example, when the pickup-device setting information transmitted from the controlling device via the transmission medium is received, an image of the object to be obtained upon reset of the image pickup device in response to the received setting information is predicted, and then the predicted image is sent to the controlling device. And upon reception of a control command from the controlling device to set the image pickup device in response to the setting information, the image pickup device is set in accordance with the setting information. Since the image to be obtained upon reset of the image pickup device in response to the setting information is thus predicted and supplied, prompt control is achievable so as to obtain a desired image with reference to the predicted image.

In the above image reproducing apparatus, image reproducing method and transmission medium of the seventh, eighth and ninth aspects, images shot by an image pickup device are stored, and pickup-device setting information at the time of shooting the images are also stored. A range of images to be reproduced is inputted, and the images corresponding to the input range are retrieved out of the entire stored images. Subsequently the images thus retrieved are converted in accordance with the setting information, and after a single composite image is formed out of the converted images, the composite image is outputted to the display device. For example, the images outputted from the image pickup device are stored as still images in a first memory, while the pickup-device setting information used at the time of shooting the images are stored in a second memory. Thereafter a range of the images to be reproduced is inputted, and the images corresponding to the input range are retrieved out of the entire images stored in the first memory. Subsequently the retrieved images are converted in accordance with the relevant setting information, and the converted images are processed to form a single composite image, which is then outputted to the display device. Therefore, it is possible to reproduce the images while changing the image-pickup shooting conditions properly.

The above and other features and advantages of the present invention will become apparent from the following description which will be given with reference to the illustrative accompanying drawings.

BRIEF DESCRIPTION OF THE DRAWINGS

FIG. 4 is a flowchart showing an exemplary processing routine executed in the personal computer in FIG. 1;

FIG. 5 shows an example of images displayed on a CRT monitor with execution of the processing routine in FIG. 4;

DESCRIPTION OF THE PREFERRED EMBODIMENTS

Figure 1:
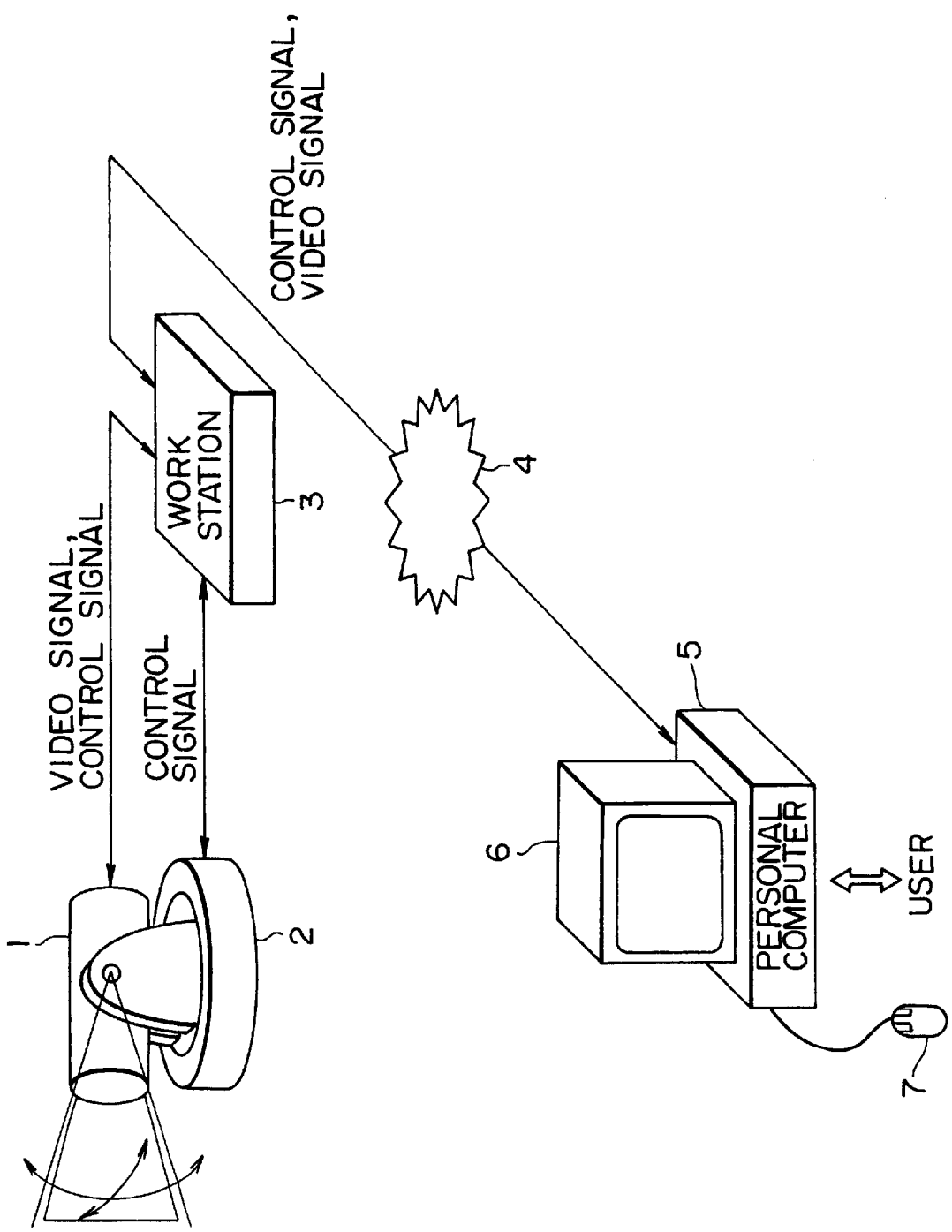
FIG. 1 schematically shows an exemplary constitution of an embodiment representing the present invention.

FIG. 1 schematically shows an exemplary constitution of an embodiment representing the present invention.

In this diagram, a television camera 1 performs photoelectric conversion of an optical image of an object to be shot into a corresponding electric signal (e.g., NTSC signal) and then outputs a video signal obtained as a result. The television camera 1 has functions of properly setting zoom, focus, exposure, white balance and so forth in response to control signal transmitted thereto from a work station 3 via an RS232C terminal.

A pan tilter 2 is capable of panning the optical axis of the video camera 1 leftward and rightward, or tilting the same upward and downward.

The work station 3 controls both the video camera 1 and the pan tilter 2 in response to control commands transmitted from a personal computer 5, and records the video signal outputted from the video camera 1. The work station 3 further executes transfer of the video signal and the control command from or to the personal computer 5 via an internet 4.

The personal computer 5 displays, on a CRT monitor 6, the image data picked up by the video camera 1 and transmitted via the work station 3 and the internet 4, and further transmits a control command, which corresponds to the data obtained from an input unit such as a mouse 7 (input means), to the work station 3 via the internet 4.

Figure 2:
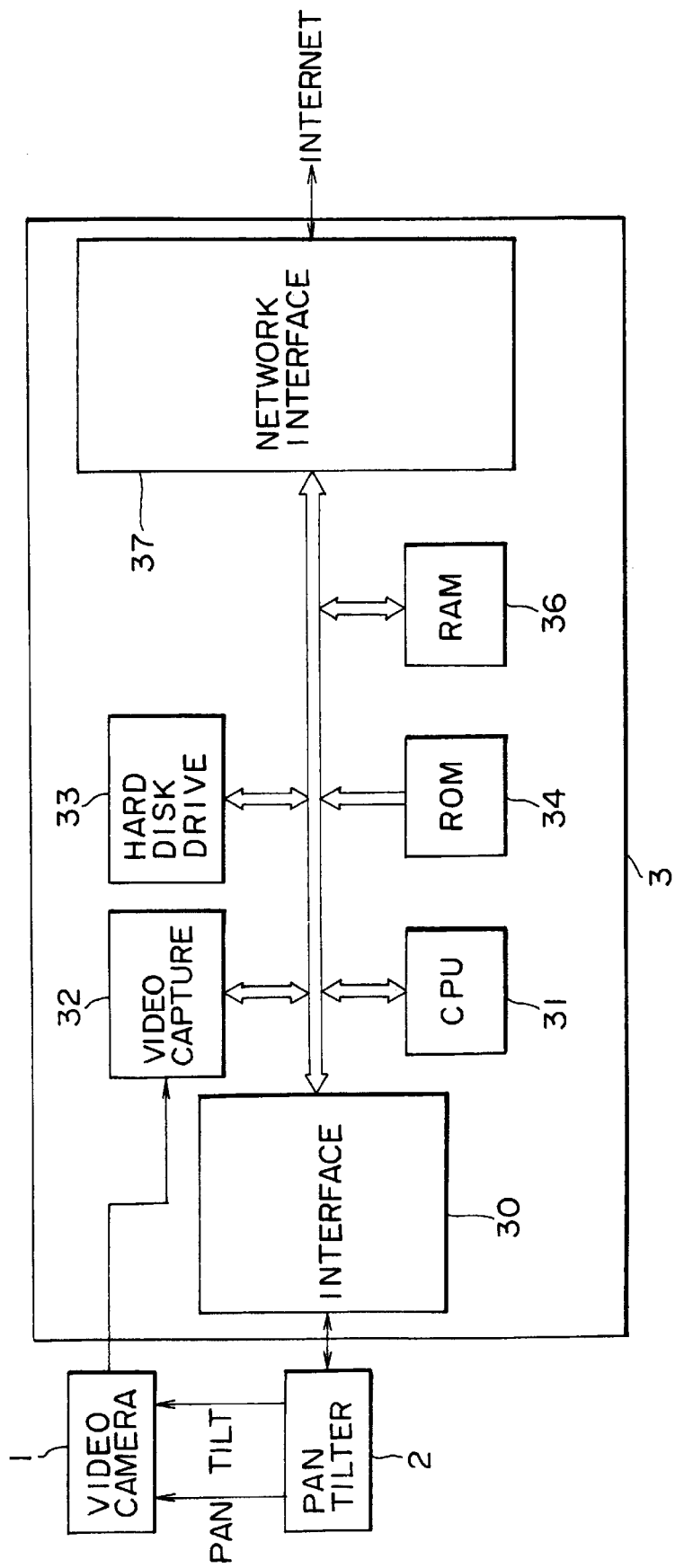
FIG. 2 is a block diagram showing a detailed structural example of a work station in FIG. 1.

FIG. 2 is a block diagram showing a detailed structural example of the work station 3 in FIG. 1.

In this diagram, an interface 30 (setting means) outputs a control signal to the pan tilter 2 for panning or tilting the video camera 1, and further serves to acquire the current state (relative to panning or tilting) of the pan tilter 2. A CPU 31 (prediction means, setting means, retrieval means, conversion means, composition means) controls each of the apparatus components and executes various processes.

A video capture 32 converts a video signal, which is based on the NTSC standard and is outputted from the video camera 1, into a digital signal (image data). A hard disk drive 33 (first storage means, second storage means) records, when necessary, the image data inputted from the video capture 32 and also records various programs and so forth.

A ROM 34 stores a basic program such as IPL (Initial Program Loader) and various data as well. A RAM 36 stores data and programs during operations when the CPU 31 executes predetermined processes.

A network interface 37 (receiving means, sending means) converts internal-format data of the work station 3 into data conforming with the internet protocol and then outputs the same, and converts the data transmitted thereto via the internet 4 into internal-format data of the work station 3.

Correctly, the work station 3 is connected via an ethernet to the internet 4. Hereinafter this work station 3 will be occasionally referred to as a server.

Figure 3:
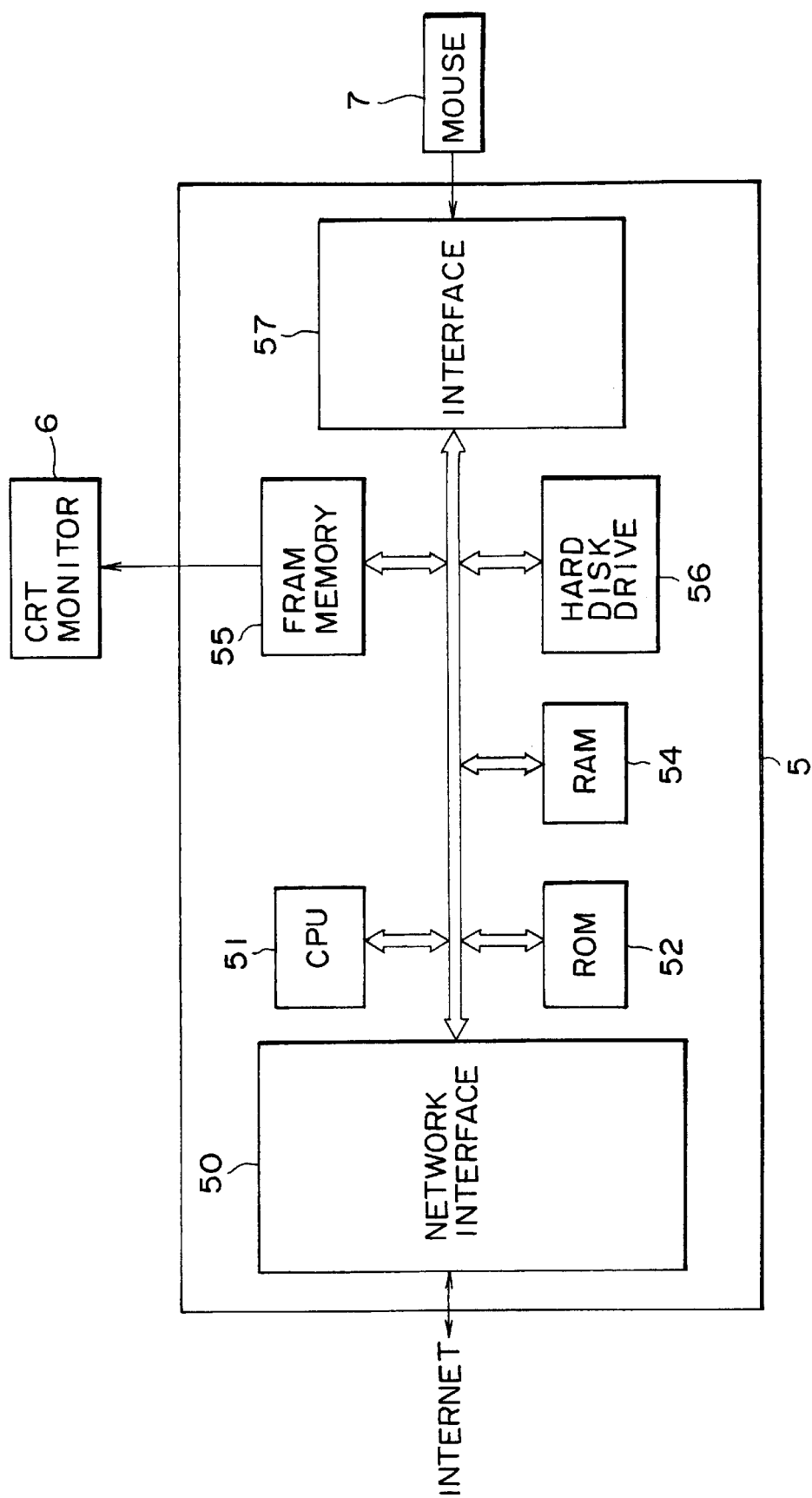
FIG. 3 is a block diagram showing a detailed structural example of a personal computer in FIG. 1.

FIG. 3 is a block diagram showing a detailed structural example of the personal computer 5 in FIG. 1.

In this diagram, a network interface 50 (sending means) converts the data transmitted thereto via the internet 4 into internal-format data of the personal computer 5, or converts the internal-format data of the personal computer 5 into data conforming with the internet protocol and then outputs the converted data to the internet 4.

A CPU 51 (prediction means, decision means, selection means) controls the apparatus components and executes various processes. A ROM 52 stores basic software such as IPL and data as well.

When image data recorded in a hard disk drive 56 (first storage means, second storage means) or image data transmitted via the internet 4 is written, a frame memory 55 (output means) converts such image data into RGB signal and then outputs the same to a CRT monitor 6.

A RAM 54 stores programs or data being processed during operations of the CPU 51. The hard disk drive 56 records various programs or the image data transmitted thereto via the internet 4.

An interface 57 receives the data obtained from an input unit such as a mouse 7 and then supplies the received data to the CPU 51.

The personal computer 5 executes processes including display of image, acceptance of manipulation input, recording or reproduction and communication in accordance with browser software and also software described in JAVA language and transmitted from a server.

Now the operation performed in the above embodiment will be explained below with reference FIG. 4.

FIG. 4 is a flowchart for explaining a processing routine executed in the personal computer 5 of FIG. 3.

In this processing routine, the CPU 51 in the personal computer 5 first executes initialization at step S1. More specifically, the CPU 51 starts transfer of data from or to the work station (server) 3 after being connected to the internet 4 via a public line or the like.

At next step S2, the CPU 51 requests the work station 3 to transmit a wide-range image (hereinafter referred to as a panorama image) which can be shot by the camera 1. As a result, the CPU 31 in the work station 3 reads out the panorama image shot previously by the video camera 1 and stored in the hard disk drive 33, and then sends the panorama image via the network interface 37. Subsequently the CPU 51 in the personal computer 5 receives, via the network interface 50, the panorama image sent from the work station 3 and then records the panorama image in the hard disk drive 56 while displaying the same on the CRT monitor 6.

FIG. 5 shows an example of images displayed on the CRT monitor 6 in the above case. In this example, a panorama image 100 is displayed on the screen, and the image being currently shot by the video camera 1 is displayed at the center with an enclosure frame 101. This frame 101 has the same aspect ratio as that of the screen of the CRT monitor 6. The image within the frame 101 is enlarged in an upper right portion of the screen and is displayed as an image 102 being currently shot. A preview image 104 prior to execution of a manipulation and a frame 103 thereof will be described later.

In the display, the rectangular frame may be replaced with some other display expression where the color of the area within the frame is different from that of any other area so as to be conspicuous in appearance.

At step S3, the CPU 51 is kept on standby for an event. That is, the CPU 51 stands by until occurrence of any event such as a movement of the mouse 7 or a manipulation of its button. And upon occurrence of an event, the processing advances to step S4.

At step S4, the CPU 51 makes a decision as to whether the button of the mouse 7 has been depressed or not. And if the result of this decision is YES to signify depression of the button, the processing advances to step S5. Meanwhile, if the result of the above decision is NO to signify no depression of the button, the processing advances to step S12.

Thus, when the result of the decision at step S4 is YES to indicate that the button of the mouse 7 has been depressed, the processing advances to step S5, where the position of the mouse 7 on the screen is acquired. And then the processing advances to step S6.

At step S6, the CPU 51 makes a decision as to whether the button-depressed position of the mouse 7 is on the frame 101 shown in FIG. 5 (or in the vicinity of the frame). And if the result of this decision is NO to signify that the button-depressed position of the mouse 7 is not on the frame 101, then the processing advances to step S7. Meanwhile, if the result of the above decision is YES to signify that the position is on the frame 101, the processing advances to step S10.

Figure 6:
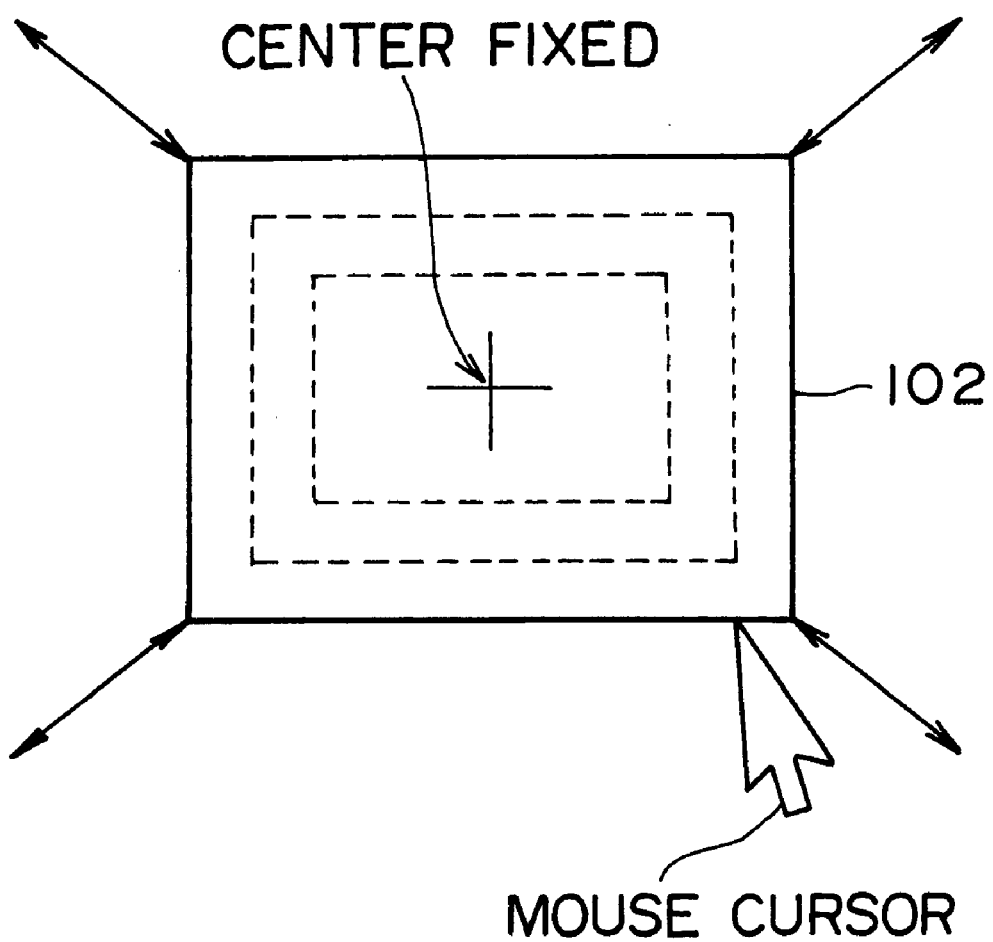
FIG. 6 shows an example of a frame displayed on the CRT monitor with execution of the processing routine in FIG. 4.

At step S10, a drag for changing the view angle is started. That is, as shown in FIG. 6, the CPU 51 enlarges or reduces the frame 101 dimensionally in accordance with the movement distance of the mouse 7 and then displays a new frame 102. In this process, the frame 102 is so drawn as to be similar in shape to the original frame 101 in such a manner that the respective centers coincide with each other. Thereafter the processing advances to step S9.

When the result of the decision at step S6 is NO to signify that the position is not on the frame 101, the processing advances to step S7, where another decision is made as to whether the button of the mouse 7 has been depressed within the frame 101. And if the result of this decision is NO to signify that the button depression is not within the frame 101, the processing advances to step S11, where a drag is started while the view angle is kept fixed. More specifically, the CPU 51 draws a new frame 102 of the same dimensions in accordance with the movement of the mouse 7 while erasing the former frame 102. Consequently, the frame 102 is moved in a manner to follow the mouse 7. And then the processing advances to step S9.

If the result of the decision at step S7 is NO to signify that the position is not within the frame 101, the processing advances to step S8, where the CPU 51 displays a new frame 102 whose center coincides with the button-depressed position of the mouse 7. In case there exists any cursor movement of the mouse 7, the CPU 51 starts movement of the new frame thus displayed. That is, the frame 102 (equal in size to the frame 101) is plotted regardless of the position of the frame 101.

At next step S9, the CPU 51 reads the image data, which is relevant to the area enclosed by the frame 102, out of the panorama image data stored in the hard disk drive 56 and, after a process of enlarging or reducing the read data, displays the same as a preview image 104 prior to the manipulation in the upper left portion of the screen. Thereafter the processing returns to step S3, and the above routine is executed repeatedly.

If the result of the decision at step S4 is NO to signify no depression of the button of the mouse 7, the processing advances to step S12, where another decision is made as to whether the button of the mouse 7 has been released or not. And when the result of this decision is YES to signify release of the button of the mouse 7, the processing advances to step S13. Meanwhile, if the result of the above decision is NO to signify no release of the button, the processing advances to step S17. Hereinafter the processes of steps S18 to S21 will be described with priority to those of steps S13 to S16.

At step S17, the CPU 51 makes a decision as to whether the mouse 7 has been moved or not. And if the result of this decision is NO to signify no movement of the mouse 7, the processing advances to step S23. Meanwhile, if the result of the above decision is YES to signify any movement of the mouse 7, the processing advances to step S18.

At step S18, the CPU 51 makes a decision as to whether the mouse 7 is in drag (in a state of movement with its button being depressed). And if the result of this decision is NO to signify that the mouse 7 is not in drag, the processing returns to step S3, and the aforementioned routine is repeated. Meanwhile, when the result of the above decision is YES to signify that the mouse 7 is in drag, the processing advances to step S19.

Subsequently at step S19, a decision is made as to whether a process of changing the view angle is being currently executed or not. That is, if the result of the decision at step S6 in the preceding process signifies depression of the button of the mouse 7 on the frame 101, the CPU 51 regards the result as YES and then the processing advances to step S22. In the other case, the processing advances to step S20.

At step S20, the CPU 51 draws a new frame 102 of the same dimensions in accordance with the direction of movement of the mouse 7 while erasing the former frame 102. Consequently, the frame 102 is moved in a manner to follow the mouse 7.

When the result of the decision at step S19 is NO, the processing advances to step S22, where the CPU 51 draws a reduced or enlarged frame 102 in conformity with the movement distance of the mouse 7 on the basis of the dimensions of the former frame 102 (or frame 101) obtained at the button-depressed time of the mouse 7. Thereafter the processing advances to step S21.

At step S21, the CPU 51 reads out, from the hard disk drive 56, the image data relevant to the area enclosed by the new frame 102 drawn at step S20 or S22, and then writes the image data in a predetermined area of the frame memory 55. Consequently, the image data of the area specified by the frame 102 is displayed as a preview image 104. Thereafter the processing returns to step S3, and then the aforementioned routine is repeated.

If the result of the decision at step S12 is YES to signify that the button of the mouse 7 has been released, the processing advances to step S13.

At step S13, the CPU 51 terminates the drag, i.e., interrupts both the process of drawing the new frame 102 and the process of displaying the preview image 104. Consequently, the frame 102 is kept displayed at a predetermined position in the panorama image 100, and the preview image 104 being displayed is the one relevant to the area enclosed by the frame 102.

At next step S14, the CPU 51 calculates, from the position and the dimensions of the frame 102, both the desired shift direction for the pan tilter 2 and the view angle to be changed. More specifically, the CPU 51 calculates the center position of the frame 102 and then calculates the required pan and tilt quantities of the pan tilter 2 so that the optical axis of the video camera 1 is rendered coincident with the desired direction. Further the CPU 51 calculates the required zoom quantity of the video camera 1 on the basis of the dimensions of the frame 102. And then the processing advances to step S15.

At step S15, the CPU 51 supplies to the network interface 37 the pan, tilt and zoom quantities calculated at step S14 and then transmits the same via the internet 4 to the work station 3.

As a result, the work station 3 receives the data transmitted thereto from the network interface 37. Then the CPU 31 supplies the received pan and tilt quantities to the pan tilter 2 via the interface 30. Consequently, the pan tilter 2 shifts the video camera 1 leftward or rightward by an angle corresponding to the pan quantity, and also shifts the video camera 1 upward or downward by an angle corresponding to the tilt quantity.

Further the CPU 31 outputs the zoom quantity to the video camera 1 via the interface 30, whereby the optical system of the video camera 1 is so controlled as to perform zooming correspondingly to the zoom quantity.

Upon completion of setting the video camera 1 and the pan tilter 2, the CPU 31 converts the output image of the video camera 1 into digital data (image data) by the video capture 32 and then sends the converted image data via the network interface 37 to the personal computer 5. The image data thus sent is received and displayed through the processes subsequent to step S23. The details thereof will be described later.

Referring back to FIG. 4 again, the frame 102 and the preview image 104 are erased from the screen at step S16. That is, only the image being currently shot is displayed on the screen. Thereafter the processing returns to step S3, and the aforementioned routine is repeated.

If the result of the decision at step S17 is NO to signify no movement of the mouse 7, the processing advances to step S23.

The CPU 51 makes a decision at step S23 as to whether the image data transmitted from the work station 3 has been received or not. And if the result of this decision is NO to signify no reception of the image data, the processing advances to step S26 to display, on the CRT monitor 6, a message which means generation of an error, such as "Communication error generated". (When any event is existent, there never occurs a case where the result of the decision indicates NO at each of steps S4, S12, S17 and S23). Subsequently the processing returns to step S3, and then the aforementioned routine is repeated. If the result of the decision at step S23 is YES to signify reception of the image data, the processing advances to step S24.

At step S24, the CPU 51 displays, on the CRT monitor 6, the image data received by the network interface 50 as the image 102 being currently shot. Then the processing advances to step S25, where the CPU 51 sends a command, which requests transmission of the next image, to the work station 3 via the network interface 50. Thereafter the processing returns to step S3, and the aforementioned routine is repeated.

Next, the above processing routine will be explained further concretely.

Supposing now that the personal computer 5 is switched on, initialization is executed at step S1, and a circuit is closed in connection to the work station 3. Then at step S2, the personal computer 5 sends a command to the work station 3 to request transmission of the panorama image. Consequently, the received panorama image is displayed on the CRT monitor 6 (FIG. 5) while being stored in the hard disk drive 56.

At step S3, the CPU 51 is kept on standby for occurrence of an event such as a manipulation of the mouse 7 or reception of the image data.

Assume now that the button of the mouse 7 has been depressed on the frame 101 on the screen of, for example, FIG. 5 where none of the preview image 104 and the frame 102 is displayed. Then the processing advances from step S3 to step S4, where the result of the decision indicates YES, and the processing advances to step S5.

At step S5, the position of the mouse 7 on the screen is acquired. And then a decision is made at step S6 as to whether the mouse cursor is positioned on the frame 101 or not. Since the mouse cursor is now existent on the frame 101, the result of the decision is YES, and then the processing advances to step S10.

At step S10, a new frame 102 is displayed on the screen (at the same position as that of the frame 101), and there is started a process to change the view angle (size) of the frame 102 in accordance with the movement of the mouse 7.

When the button of the mouse 7 has been depressed in case the mouse cursor is positioned within the frame 101, the result of the decision at step S7 indicates YES, and the processing advances to step S11. Then at step S11, a new frame 102 is displayed (at the same position as that of the frame 101), and there is started a process to move the frame 102 in compliance with the mouse 7 while keeping the view angle fixed.

Meanwhile, when the button of the mouse 7 has been depressed in any area different from the frame 101, a new frame 102 equal in size to the frame 101 is displayed around the button-depressed position of the cursor. And at step S9, a preview image 104 is formed and then is displayed on the screen of the CRT monitor 6.

If the mouse 7 is dragged in a state where the new frame 102 is displayed, the result of the decision at step S12 is NO since the button is not released, so that the processing advances to step S17. The result of the decision at this step is YES, and then the processing advances to step S18.

The result of the decision at step S18 is YES since the mouse 7 is in drag, and the processing advances to step S19. At this step, a decision is made as to whether a process of changing the view angle is being currently executed or not. And if this process is being executed (i.e., when the drag start point is on the frame 101), the processing advances to step S22, where the size of the frame 102 is changed in accordance with the distance of movement of the mouse 7. In the other case (where the drag start point is inside or outside the frame 102), the frame 102 is moved in compliance with the mouse 7. And at step S21, the preview image 104 is displayed on the screen.

Consequently, during a drag of the mouse 7, the images corresponding to the area enclosed by the frame 102 are displayed successively as preview images 104 on the screen, hence enabling the operator to retrieve any desired scene with reference to such displayed images.

And upon determination of the desired scene to be actually seen, the drag of the mouse 7 is interrupted with release of the button, so that the result of the decision at step S12 indicates YES. Subsequently at step S14, the zoom, pan and tilt quantities are calculated on the basis of the size and position of the current frame 102, and then are transmitted to the work station 3. Therefore the optical axis of the video camera 1 is controlled simultaneously with zooming, and the image data thus obtained are transmitted via the internet 4.

Upon reception of the image data by the personal computer 5, the result of the decision at step S23 indicates YES to signify reception of the image. And then the processing advances to step S24, where the received image is displayed on the CRT monitor 6. Thereafter the processing advances to step S25 to request transmission of the next image. Subsequently the aforementioned routine is repeated, and the images shot by the video camera 1 are transmitted successively, so that each of them is displayed as the current image 102 on the screen of the CRT 6.

Figure 7:
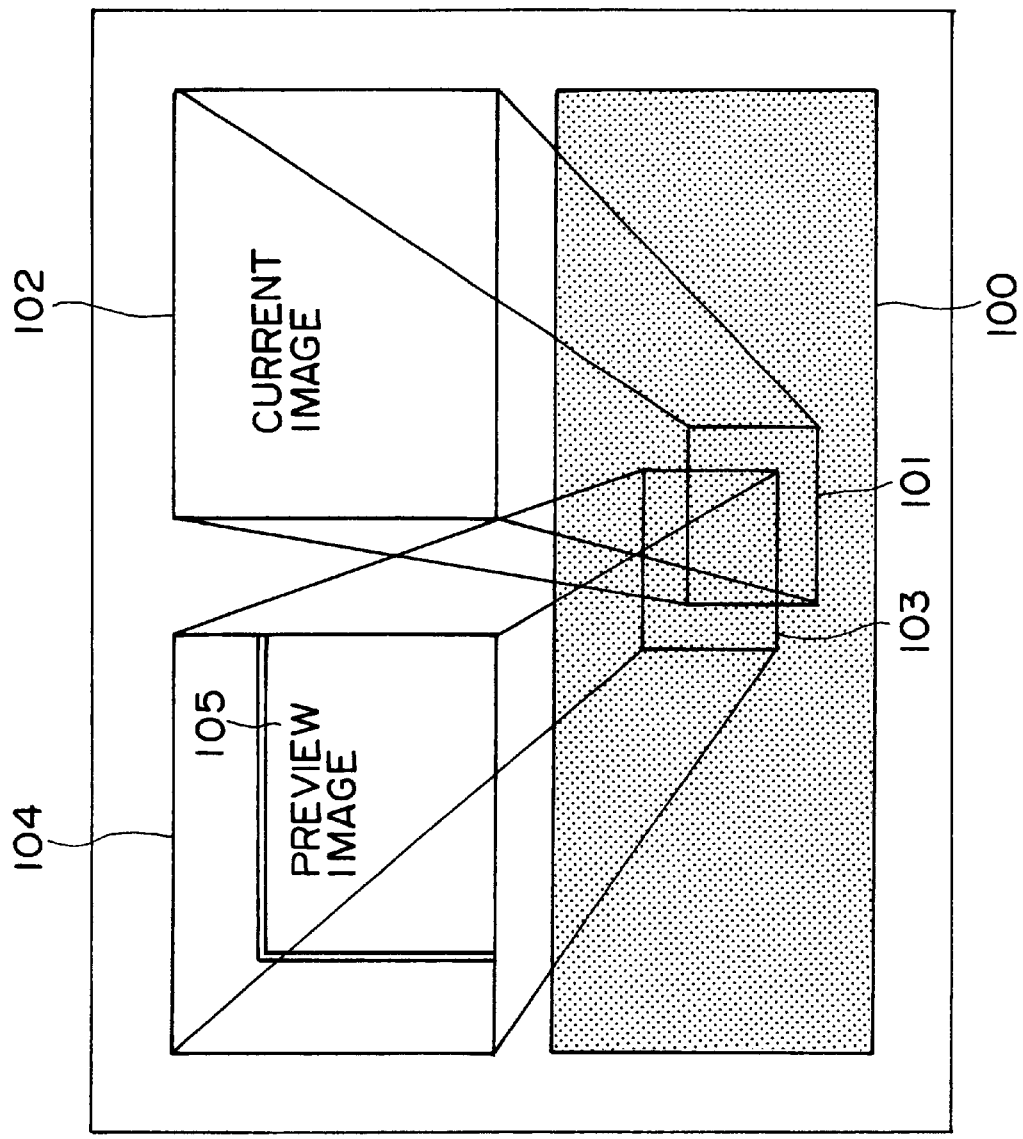
FIG. 7 shows a display example where a shot image is used when two frames mutually overlap in execution of the processing routine in FIG. 4.

In case the two frames 101 and 103 partially overlap with each other as shown in FIG. 7, the image being currently shot by the video camera 1 and transmitted therefrom may be displayed in the overlap area, while other images extracted from the panorama image may be displayed in the other areas. According to this method, it becomes possible to display a moving image partly in case the areas of the two frames 103 and 101 overlap with each other.

Figure 8:
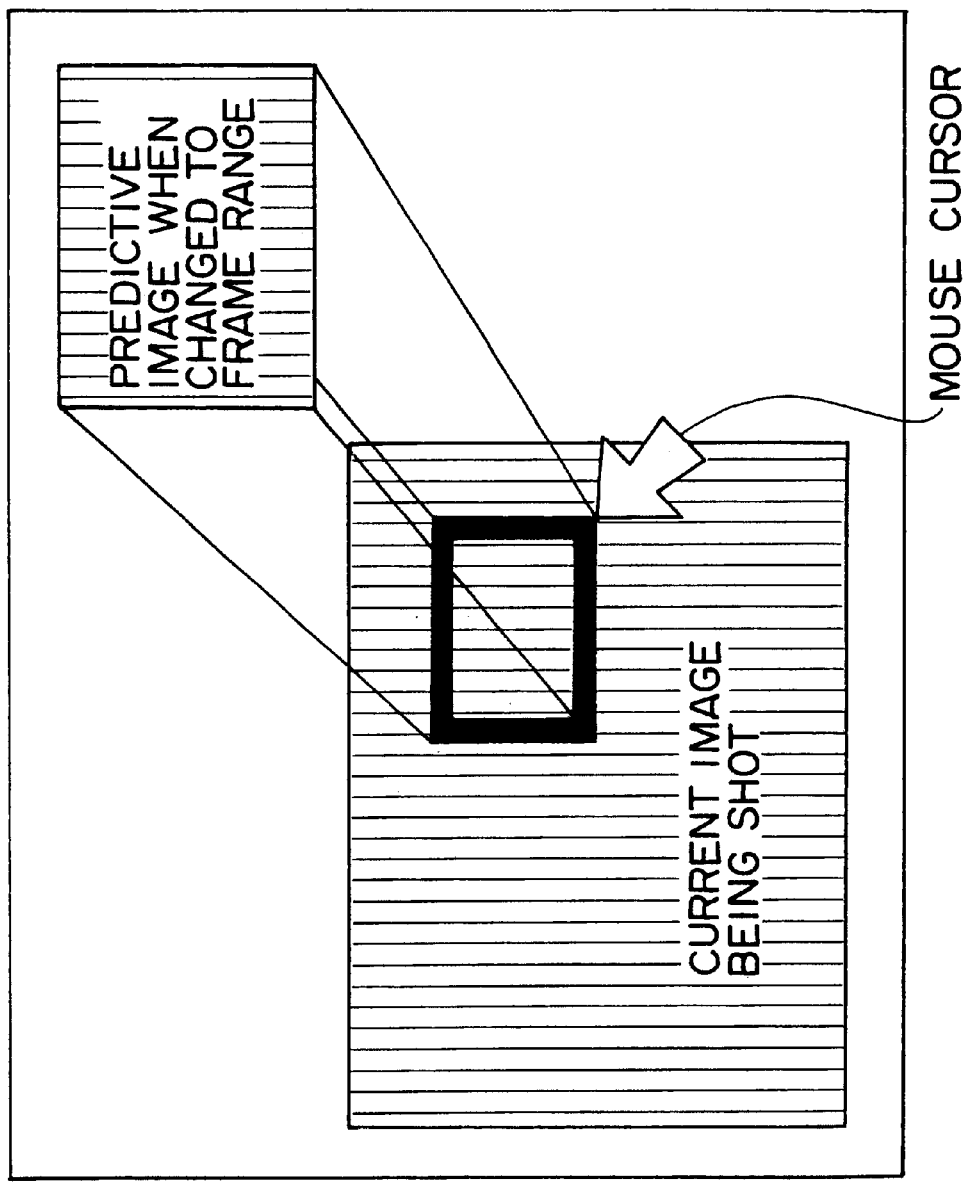
FIG. 8 shows a display example where a predicted image is obtained from a shot image in execution of the processing routine in FIG. 4.

In zooming a partial area of the image being currently shot, as shown in FIG. 8, the image data shot by the video camera 1 and transmitted therefrom may be zoomed and displayed instead of using the panorama image. In this case, it is possible to display the image data as a moving image through a process of up-conversion in which the pixels constituting the original image are represented by a predetermined multiple of pixels.

Figure 9:
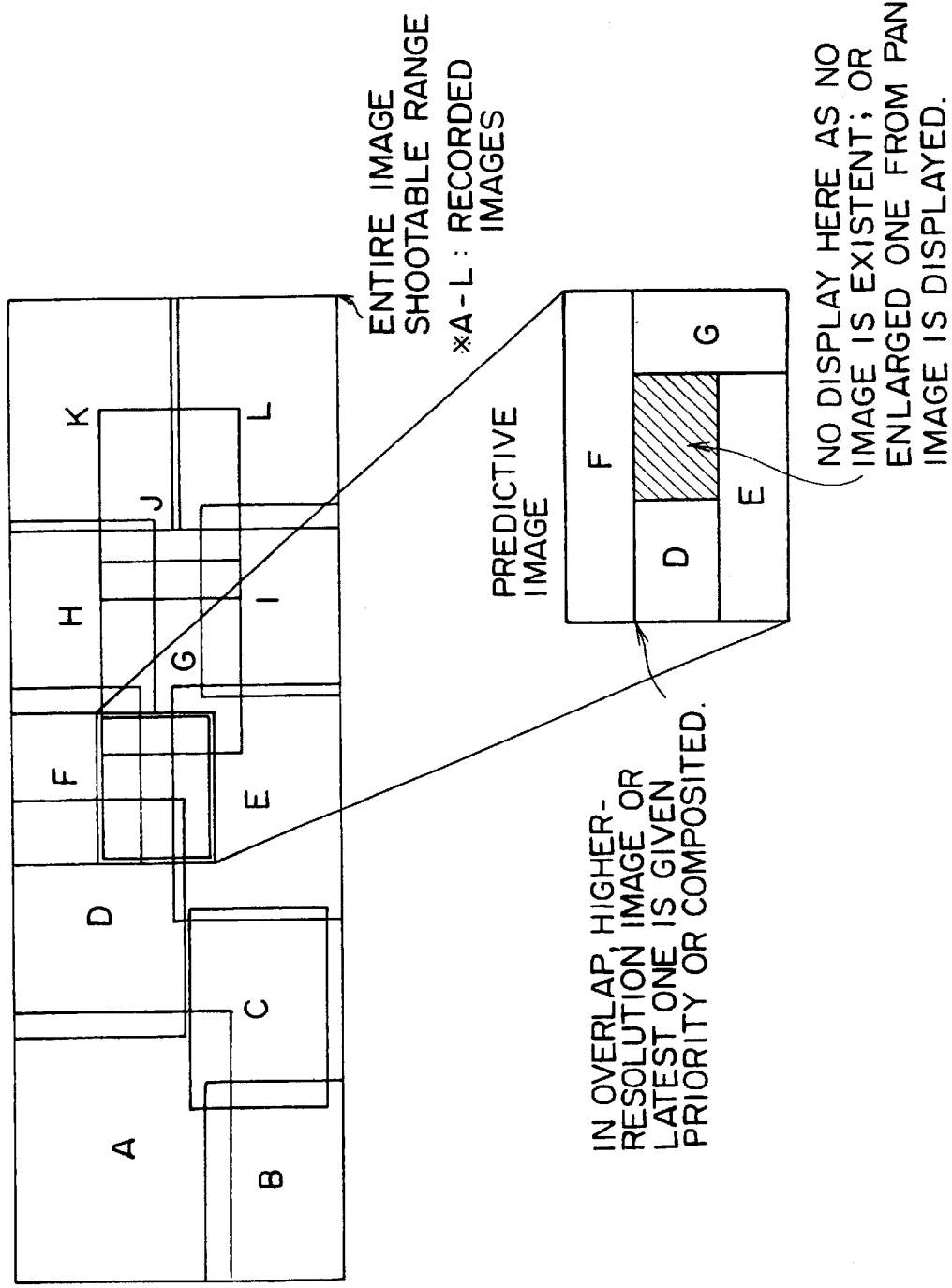
FIG. 9 shows the relationship between a predicted image and original images when the predicted image is formed from a plurality of images based on different shooting conditions.

Further, when a plurality of images have already been transmitted from the work station 3, as shown in FIG. 9, it is possible to display the preview image 104 by the use of such images instead of the panorama image.

More specifically, upon transmission of plural different images from the work station 3 by execution of manipulations (to control the video camera 1) in the personal computer 5, images A–L for example are stored in the hard disk drive 56 as shown in FIG. 9. In such a case, these latest images A–L may be used instead of the panorama image.

The processing routine executed in the above case will now be explained below with reference to flowcharts of FIGS. 10 and 11.

In the embodiment to be described below, the image data transmitted from the work station 3 have incidental information representing the image shooting conditions. The CPU 51 in the personal computer 5 receives the image data with incidental information attached thereto, and then stores the same in the hard disk drive 56. The incidental information is composed of pan-tilter control quantity (pan quantity and tilt quantity), white balance value, exposure value, zoom value, focus value, and shooting date and time.

Figure 10:
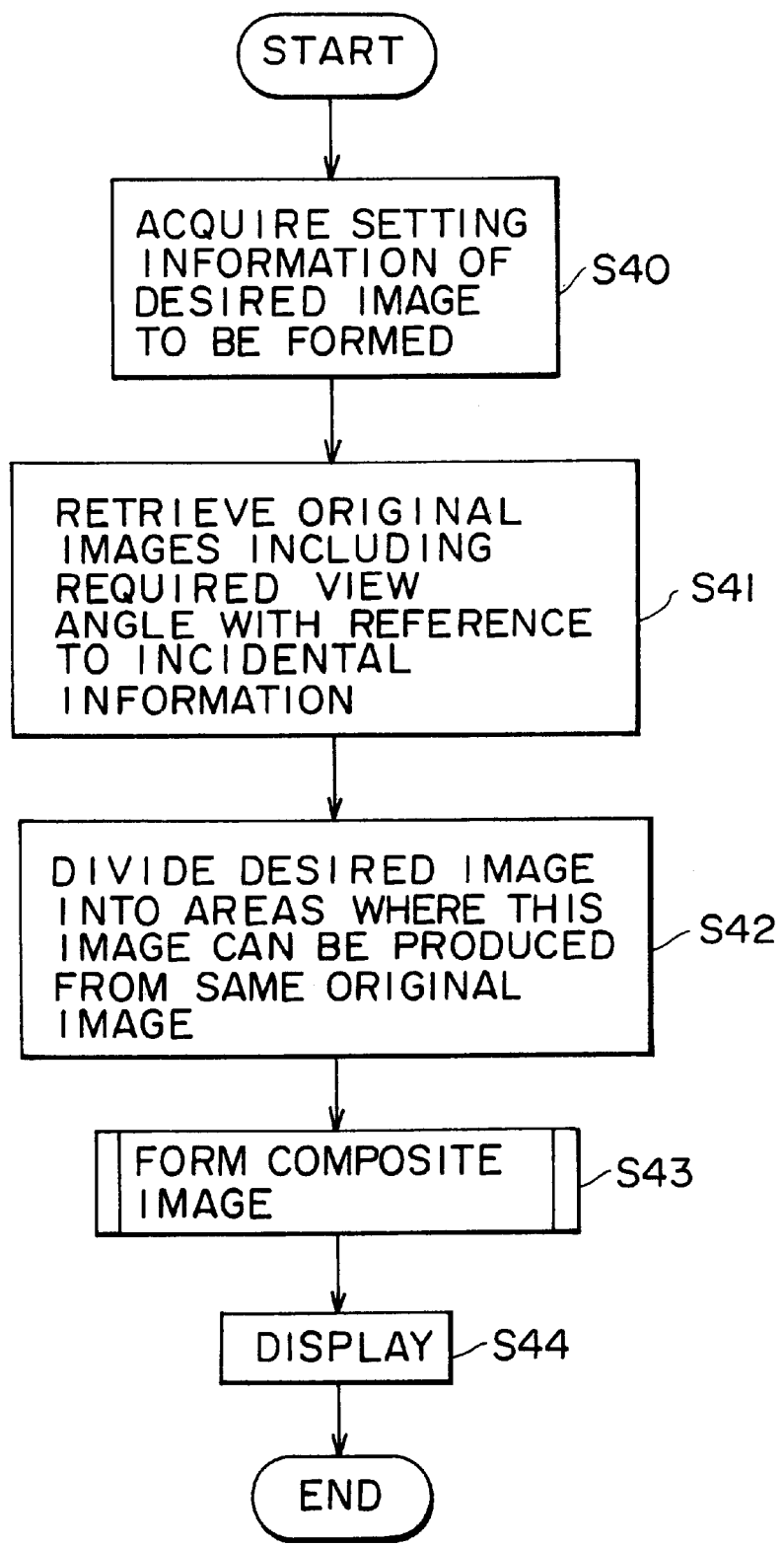
FIG. 10 is a flowchart for explaining an exemplary processing routine to form a predicted image from a plurality of images based on different shooting conditions.
Figure 11:
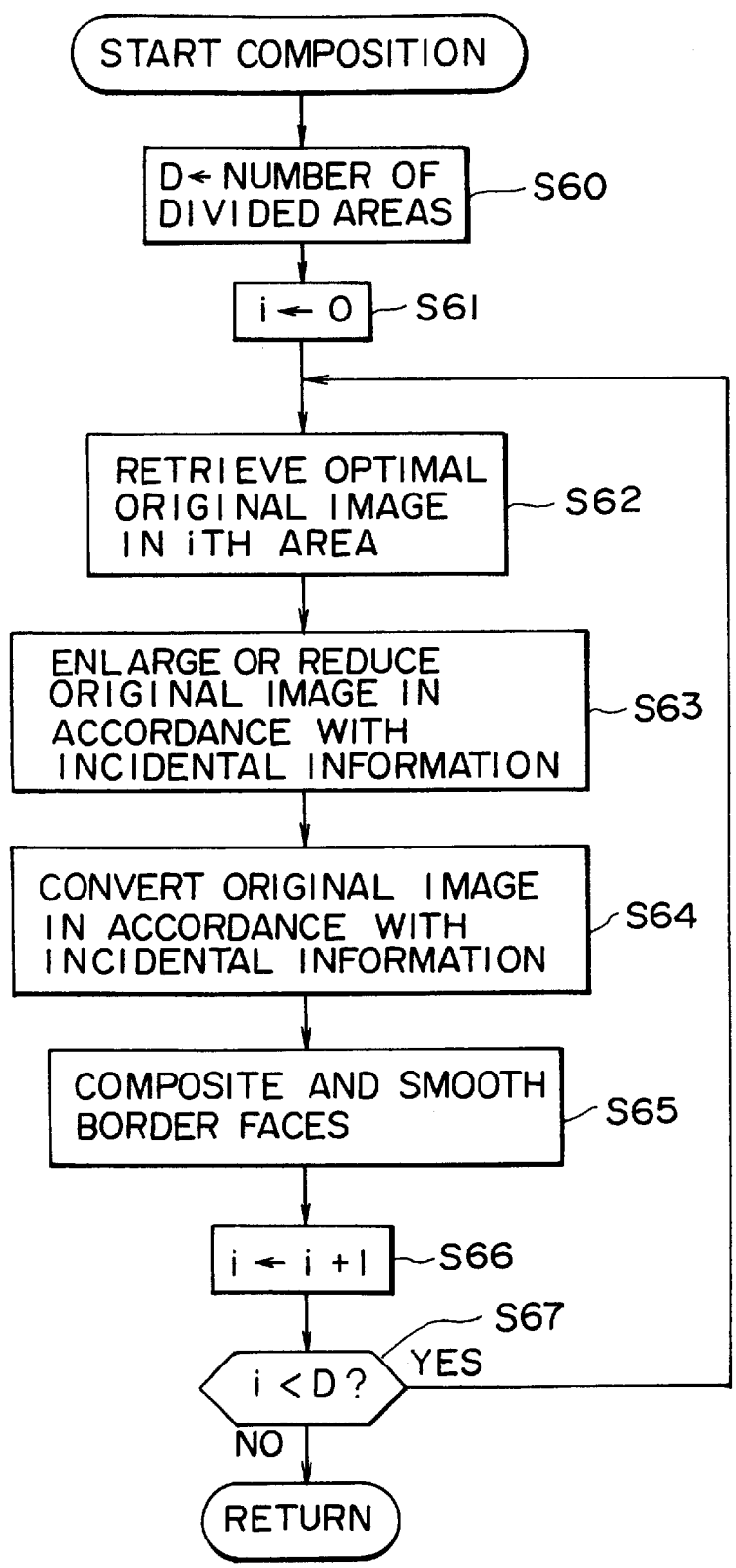
FIG. 11 is a flowchart for explaining details of the image composition process shown in FIG. 9.

The processing routine shown in FIG. 10 corresponds to steps S9 and S21 in FIG. 4, and may be replaced with the following to realize display of a preview image by using the latest image instead of a panorama image.

Upon start of the processing routine shown in FIG. 10, the CPU 51 in the personal computer 5 acquires, at step S40, setting information relative to a preview image to be formed (hereinafter referred to occasionally as desired image). The setting information in this case includes the view angle and the position of the frame 102 obtained at steps S8, S19 and S22 in FIG. 4. And the desired-image shooting conditions (e.g., white balance value, exposure value, zoom value and so forth) are inputted on a setting picture of FIG. 12 for example.

Figure 12:
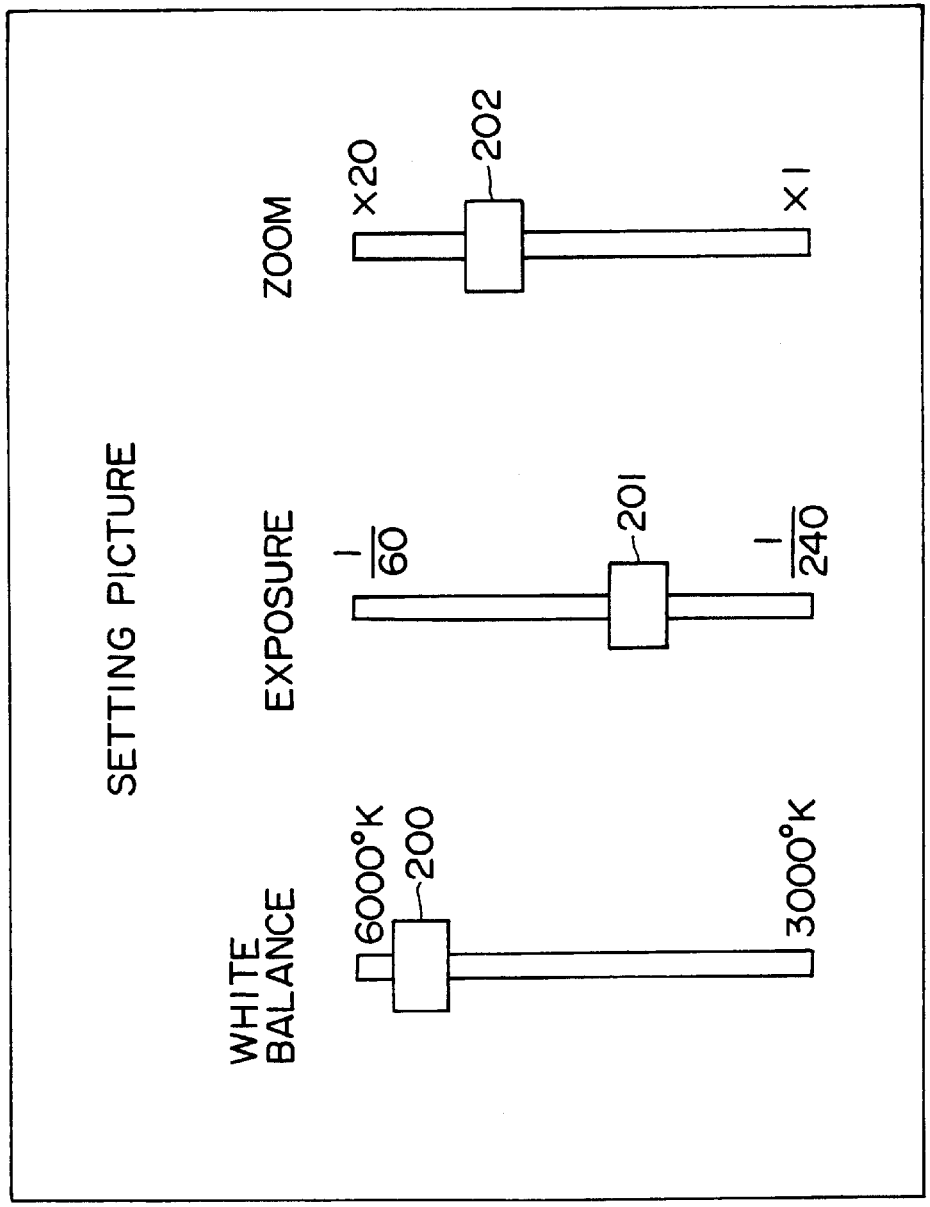
FIG. 12 shows an exemplary setting picture displayed to input shooting conditions.

On the setting picture of FIG. 12, each of the white balance value, exposure value and zoom value can be inputted by vertically shifting a relevant slider. For example, the white balance at the left end of this picture is set to a value of 6000° K when a slider 200 is shifted to its upper end. In another example, the white balance is set to a value of 3000° K when the slider 200 is shifted down to its lower end.

Figure 13:
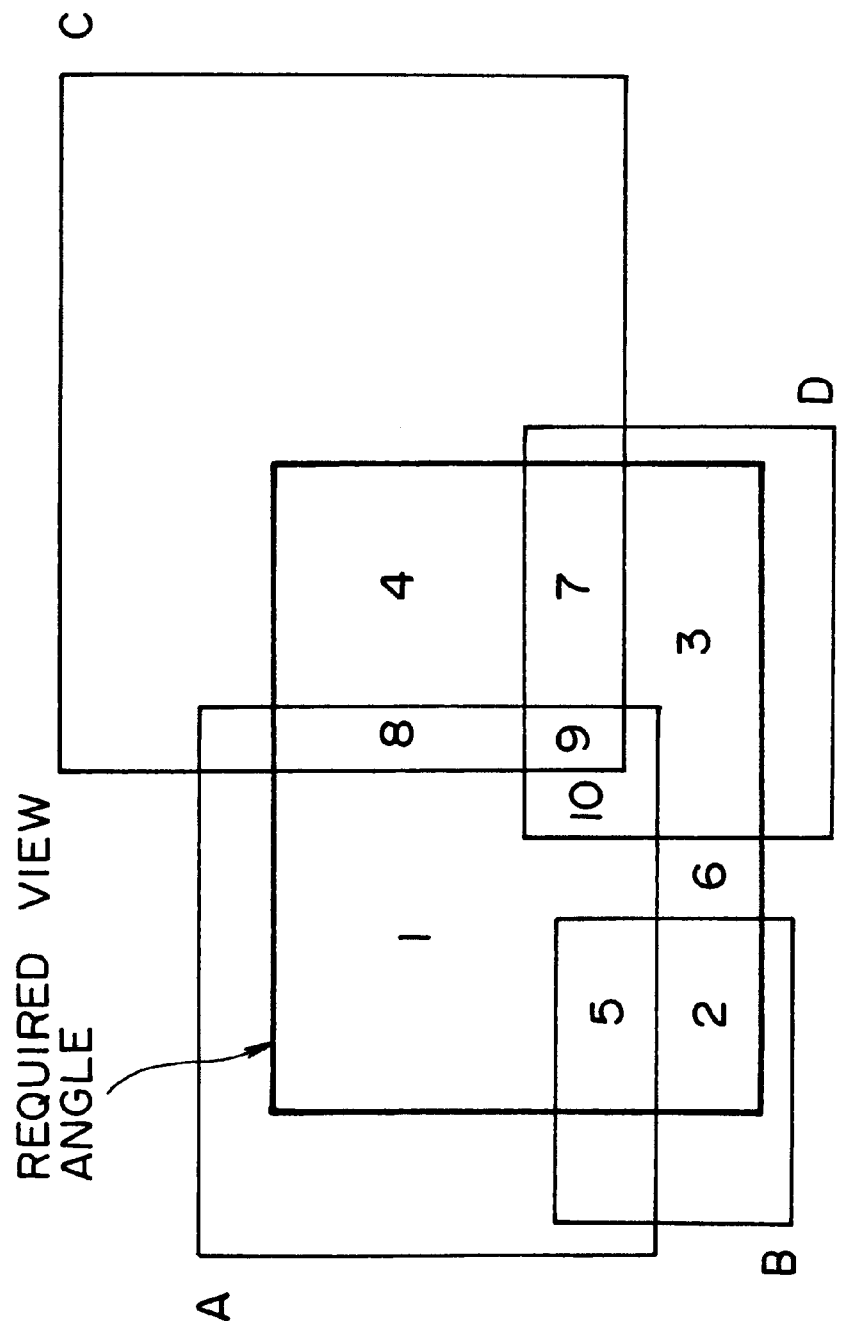
FIG. 13 is a schematic diagram for explaining an example relative to division of images.

At step S41 in FIG. 10, the CPU 51 retrieves the image data (hereinafter referred to as original image), which includes the view angle required for forming a desired image, with reference to the incidental information stored in the hard disk drive 56. That is, as shown in FIG. 13, images A–D are retrieved when forming a desired image depicted by a thick-line frame.

Subsequently at step S42, the desired image to be formed is divided into areas where this image can be produced from the same original image. That is, as shown in FIG. 13, the area corresponding to the desired image is divided into areas 1–10. And then the processing advances to step S43.

At step S43, optimal original images are selected in the areas 1–10 respectively, and the selected original images are processed through predetermined conversion to form a composite image. The details of this process will be described later with reference to FIG. 11.

Thereafter at step S44, the composite image produced at step S43 is displayed on the CRT monitor 6.

Next, the process executed at step S43 will be described in detail below with reference to FIG. 11.

Upon start of this process, first at step S60, the CPU 51 substitutes the number of the divided areas (numerical value "10" in the example of FIG. 13) for a variable D. And then the processing advances to step S61. Subsequently at step S61, the CPU 51 initially sets a variable i, which is used to store the number of processes, to a numerical value 0. At next step S62, the CPU 51 selects an optimal original image in the ith area. Supposing now that i=5 for example, the relevant area is No. 5. And the images A and B are existent as original images including this area 5. However, since the shot range of the image B is narrower than that of the image A, the image B having a higher resolution is selected as an optical image.

When the shot images are changed momentarily, the image temporally closest to the target time may be selected.

Relative to any area with none of original images (e.g., area 6 in FIG. 13), no image may be displayed therein, or this portion alone may be obtained from the panorama image.

At step S63, the CPU 51 enlarges or reduces the selected image with reference to the incidental information of the original image selected at step S62, in such a manner that the selected image becomes dimensionally the same as the desired image to be formed.

Subsequently at step S64, the CPU 51 processes the selected original image through predetermined conversion so that the original image selected at step S62 is equalized in shooting conditions to the desired image to be formed. The details of this process will be described later.

At next step S65, the CPU 51 writes the converted original image in a predetermined area of the frame memory 55 and then smoothes the same in a manner that the respective border faces of this image and the other original image stored already in the frame memory 55 are rendered natural in mutual contact.

The variable i is incremented numerically by 1 at step S66, and then a decision is made at step S67 as to whether the numerical value of this variable i is smaller or not than the number D of the divided areas. And if the result of this decision is YES to signify that i is numerically smaller than D, the processing returns to step S62, and then the aforementioned routine is repeated. Meanwhile, if the result of the above decision is NO to signify that i is numerically greater than D, the processing returns to step S44.

Figure 14:
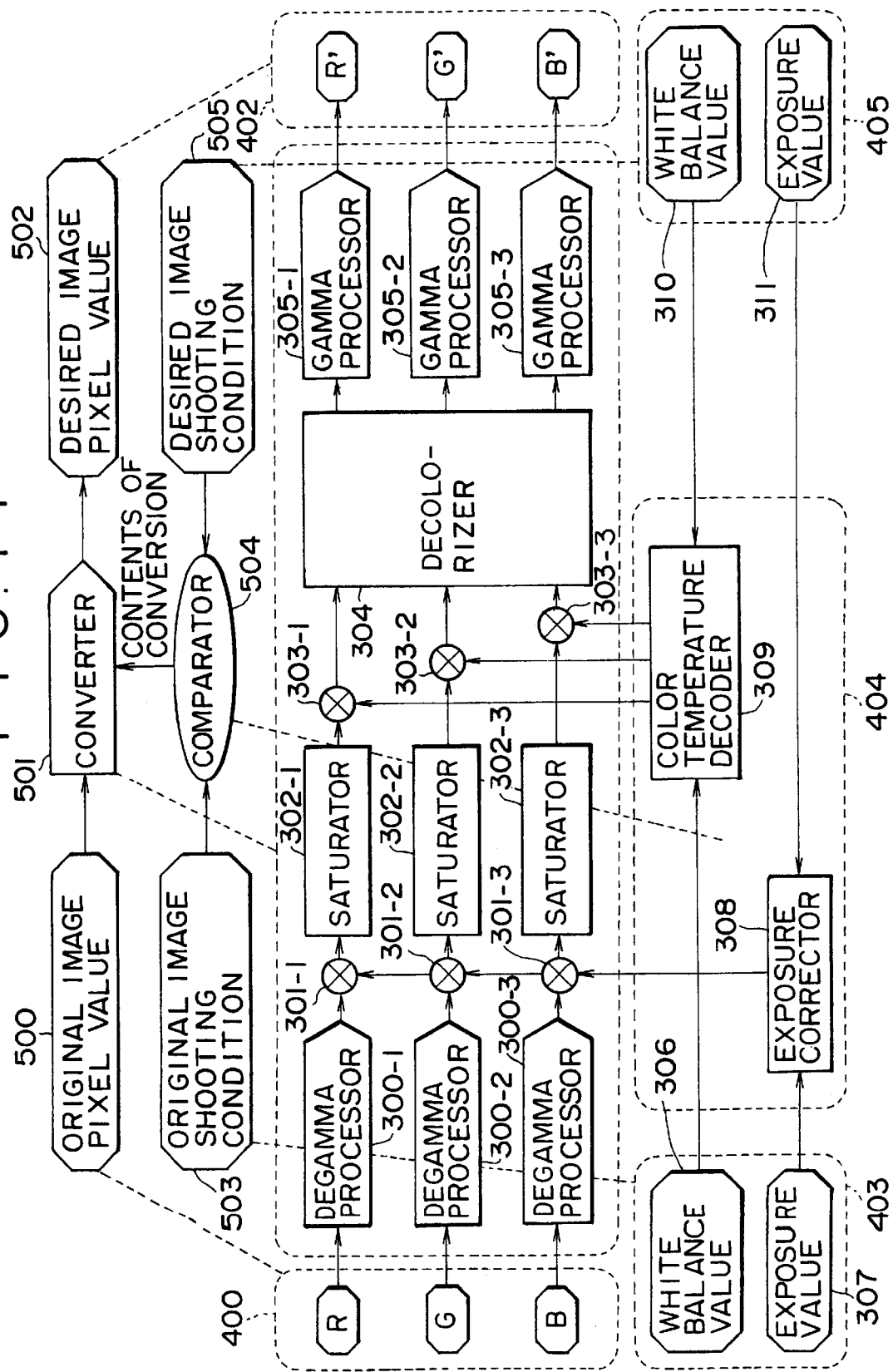
FIG. 14 is a signal flow diagram showing exemplary processes to convert shooting conditions.

FIG. 14 is a block diagram showing details of the conversion executed at step S64. In this diagram, an original image is inputted from the left end and, after execution of various conversions, a desired image obtained through such conversions is outputted from the right end. A signal flow in an upper portion of FIG. 14 explains the summary of a block diagram shown in a lower portion thereof.

Hereinafter a description will be given on the signal flow shown in an upper portion of FIG. 14, and the process of the above conversion will be described in detail with reference to the block diagram shown in a lower portion of FIG. 14.

In this diagram, a pixel value 500 of the input original image is supplied to a converter 501. Meanwhile, original-image shooting condition 503 is inputted to a comparator 504, to which desired-image shooting condition 505 is also inputted. The comparator 504 compares the original-image shooting condition 503 and the desired-image shooting condition 505 with each other and then supplies the result of such comparison to the converter 501.

The converter 501 executes conversion of the pixel value 500 of the input original image in a manner to equalize the shooting condition thereof to that of the desired image. The resultant value is then outputted as a pixel value 502 of the desired image. As a result of the above process, the pixel value 500 of the input original image is converted into an image which is equal in shooting condition to the desired image. Therefore, by repetition of the above process with regard to the pixel values of the entire areas (i.e., areas 1 to 10 in FIG. 13), a single composite image obtained under the same shooting condition can be approximately formed out of the images picked up under different shooting conditions.

Next, the diagram shown in a lower portion of FIG. 14 will be described in detail below.

The trichromatic R, G, B pixel values 400 of the original image (corresponding to the pixel value 500 of the original image) are supplied respectively to degamma processors 300-1 to 300-3, which then execute a degamma process to the gamma-corrected pixel values, thereby converting the same into pixel values proportional to the luminance.

Multipliers 301-1 to 301-3 multiply the output pixel values of the degamma processors 300-1 to 300-3 by the output of an exposure corrector 308 and then deliver the multiplied pixel values thus obtained. The exposure corrector 308 compares the original-image exposure value 307 and the desired-image exposure value 311 with each other, and outputs the time ratio of an electronic shutter to the multipliers 301-1 to 301-3 if, for example, an AGC (Automatic Gain Control) and an iris stop are fixed. Consequently, the pixel values outputted from the multipliers 301-1 to 301-3 are converted into assumed values which may be obtained when shot with the same exposure value as that of the desired image.

Saturators 302-1 to 302-3 execute conversion in consideration of the saturation characteristics of the trichromatic pixels of a CCD. That is, since the output of the CCD is saturated in response to incident light of any intensity higher than a predetermined value, the pixel values outputted from the multipliers 301-1 to 301-3 are so clipped as to have similar characteristics.

A color temperature decoder 309 compares the white balance value 306 of the original image and the white balance value 310 of the desired image with each other, then calculates a correction quantity of each color, and outputs the calculated correction quantities to the multipliers 303-1 to 303-3 respectively. Thereafter the multipliers 303-1 to 303-3 multiply the output pixel values from the saturators 302-1 to 302-3 by the correction quantities outputted from the color temperature decoder 309.

A decolorizer 304 executes a process of decolorization when reproduction of colors is difficult due to that the pixel values are in a high or low luminance range, and then outputs the resultant pixel values. Gamma processors 305-1 to 305-3 execute a gamma process to the decolorized pixel values and then output the processed pixel values as trichromatic R', G', B' ones (pixel values of desired image).

As a result of such processing, the pixel values of the original image are converted in accordance with the shooting condition of the desired image and that of the original image, and then the converted pixel values are outputted. Summarizing the above routine, the signal processing in the video camera 1 is executed again on the client side (in the personal computer 5) to form an image which is assumed to be obtained when shot under the same condition as that of the desired image. Therefore, according to the embodiment mentioned, it becomes possible to convert a plurality of original images of different shooting conditions into an equivalent image (desired image) which may be obtained under predetermined shooting condition.

In the above embodiment, when the video camera 1 and the personal computer 5 are mutually connected via a communication line or the like, the result of an operator's manipulation can be predicted and displayed by using the panorama image existing on the operator side or the image transmitted already thereto, so that all trials and errors for obtaining a desired image are performed in the vicinity of the operator, whereby fast control is rendered achievable. Moreover, since only a determined control signal is transmitted, it is possible to prevent any excess burden imposed on the camera 1.

Also in the above embodiment, both conversion and composition of the image data are executed in the personal computer 5. However, the same processes can be executed in the work station 3 as well. In this case, image composition is performed on the basis of the images stored in the hard disk drive 33 of the work station 3, so that even when a multiplicity of images are not transmitted to the personal computer 5, the aforementioned process can be executed properly.

Further in the above embodiment, the video camera 1 is controlled by the personal computer 5. However, in a modification, the work station 3 may be regarded as an image data base, and the embodiment may be applied when retrieving desired image data. According to such a modification, it becomes possible to retrieve any past image, or to form an image different in direction or magnification from the one being actually shot, or to form an image of changed shooting condition.

The transmission medium mentioned in this specification connotes any information recording medium such as floppy disk or CD-ROM, and also any network transmission medium such as internet or digital satellite.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A device for controlling an image pickup device via a transmission medium, comprising:

an input means for inputting setting information to set said image pickup device;

a first storage means for storing images transmitted from said image pickup device;

a second storage means for storing setting information corresponding to the images stored in said first storage means;

a prediction means for predicting an image of an object to be obtained upon reset of said image pickup device in response to the setting information received from said input means; said prediction means having selection means for selecting a predetermined image from the images stored in said first storage means; the prediction means predicting the image of the object on the basis of the selected predetermined image and the corresponding setting information from said second means;

an output means for outputting to a display device the image obtained from said prediction means;

a decision means for making a decision as to whether a control action corresponding to the setting information from said input means is to be executed or not; and a send means for sending a control signal, which corresponds to the setting information received from said input means, to said image pickup device via said transmission medium after execution of the control action is decided by said decision means.

2. The controlling device according to claim 1, wherein said setting information represents shooting condition of said image pickup device, and said prediction means predicts an image of an object to be obtained when said shooting condition is changed.

3. The controlling device according to claim 1, wherein said setting information represents a shooting direction or a shooting view angle of said image pickup device, and said prediction means predicts an image of an object to be obtained when the shooting direction or the shooting view angle of said image pickup device is changed.

4. The controlling device according to claim 1, wherein said prediction means predicts a shootable range of said image pickup device on the basis of a reference image shot under predetermined shooting condition.

5. A method of controlling an image pickup device via a transmission medium, comprising the steps of:

storing images transmitted from said image pickup device;

storing setting information corresponding to the stored images transmitted from said image pickup device;

inputting setting information for setting said image pickup device;

predicting an image of an object to be obtained upon reset of said image pickup device in response to the input setting information by selecting a predetermined image from the images stored in the image storing step and predicting the image of the object on the basis of the selected predetermined image and the corresponding setting information;

outputting the predicted image to a display device;

making a decision as to whether a control action corresponding to the input setting information is to be executed or not with reference to the image being displayed on said display device; and sending a control signal, which corresponds to the input setting information, to said image pickup device via said transmission medium after execution of the control action is decided in the preceding step.

6. A transmission medium for transmitting a computer program to control an image pickup device connected via the transmission medium, said computer program having functions to execute the steps of:

storing images transmitted from said image pickup device;

storing setting information corresponding to the stored images transmitted from said image pickup device;

inputting setting information for setting said image pickup device;

predicting an image of an object to be obtained upon reset of said image pickup device in response to the input setting information by selecting a predetermined image from the images stored in the image storing step and predicting the image of the object on the basis of the selected predetermined image and the corresponding setting information;

outputting the predicted image to a display device;

making a decision as to whether a control action corresponding to the input setting information is to be executed or not with reference to the image being displayed on said display device; and sending a control signal, which corresponds to the input setting information, to said image pickup device via said transmission medium after execution of the control action is decided in the preceding step.

7. A method of controlling an image pickup device by storing a program transmitted from the transmission medium defined in claim 6, and using said program to control said image pickup device.

8. A receiving apparatus for controlling an image pickup device in response to a control signal transmitted thereto from a controlling device via a transmission medium, said receiving apparatus comprising:

a receiving means for receiving pickup-device setting information transmitted thereto from said controlling device via said transmission medium;

a first storage means for storing images transmitted from said image pickup device;

a second storage means for storing setting information corresponding to the images stored in said first storage means;

a prediction means for predicting an image of an object to be obtained upon reset of said image pickup device in response to the setting information received by said receiving means; said prediction means having selection means for selecting a predetermined image from the images stored in said first storage means; the prediction means predicting the image of the object on the basis of the selected predetermined image and the corresponding setting information from said second means;

a send means for sending to said controlling device the image obtained from said prediction means; and a setting means for setting said image pickup device in response to the setting information upon reception of a control command from said controlling device to set said image pickup device in response to the setting information.

9. A receiving method for controlling an image pickup device in response to a control signal transmitted thereto from a controlling device via a transmission medium, said receiving method comprising the steps of:

storing images transmitted from said image pickup device;

storing setting information corresponding to the stored images transmitted from said image pickup device;

receiving pickup-device setting information transmitted thereto from said controlling device via said transmission medium;

predicting an image of an object to be obtained upon reset of said image pickup device in response to the received setting information by selecting a predetermined image from the images stored in the image storing step and predicting the image of the object on the basis of the selected predetermined image and the corresponding setting information;

sending the predicted image to said controlling device; and setting said image pickup device in response to the setting information upon reception of a control command from said controlling device to set said image pickup device in response to the setting information.

10. A transmission medium for transmitting a computer program used in a receiving apparatus to control an image pickup device in response to a control signal transmitted from a controlling device via the transmission medium, said computer program having functions to execute the steps of:

storing images transmitted from said image pickup device;

storing setting information corresponding to the stored images transmitted from said image pickup device;

receiving pickup-device setting information transmitted from said controlling device via said transmission medium;

predicting an image of an object to be obtained upon reset of said image pickup device in response to the received setting information by selecting a predetermined image from the images stored in the image storing step and predicting the image of the object on the basis of the selected predetermined image and the corresponding setting information;

sending the predicted image to said controlling device; and setting said image pickup device in response to the setting information upon reception of a control command from said controlling device to set said image pickup device in response to the setting information.

11. A receiving method comprising:

storing a program transmitted from the transmission medium defined in claim 10, and receiving a control command from a controlling device by the use of said program.

\* \* \* \* \*